(No Model.)

B. H. BRISTOL.
HAND TRUCK.

No. 260,833. Patented July 11, 1882.

WITNESSES:
Chas. Nida
Charles E. Simms Jr.

INVENTOR
Benjamin H. Bristol
BY
ATTORNEY

UNITED STATES PATENT OFFICE.

BENJAMIN H. BRISTOL, OF NAUGATUCK, CONNECTICUT.

HAND-TRUCK.

SPECIFICATION forming part of Letters Patent No. 260,833, dated July 11, 1882.

Application filed February 14, 1882. (No model.)

*To all whom it may concern:*

Be it known that I, BENJAMIN H. BRISTOL, of Naugatuck, New Haven county, State of Connecticut, have invented a new and useful Improvement in Hand-Trucks; and I do hereby declare that the following is a full, clear, and exact description of the same, reference being had to the accompanying sheet of drawings, making part of this specification.

This invention is in the nature of an improvement in hand-trucks; and the invention consists in a hand-truck with its axle-arm bent and lowered, and in combination with a supporting-frame, front wheels, and fixed elevated handle, as is more particularly described hereinafter.

Figure 1:
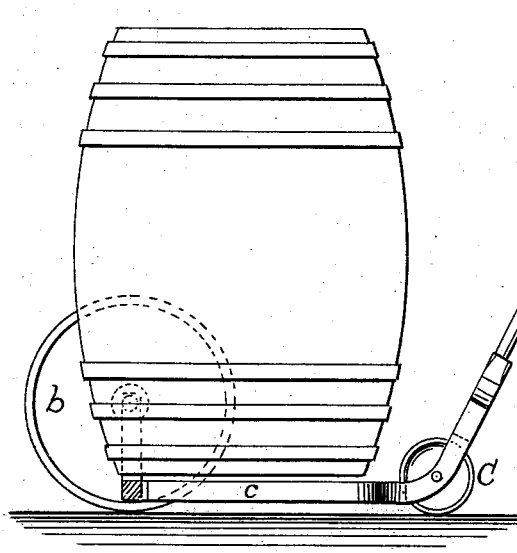
Figure 2:
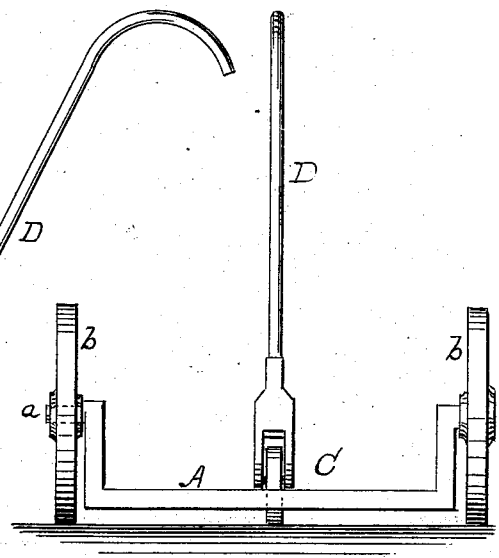
Figure 3:
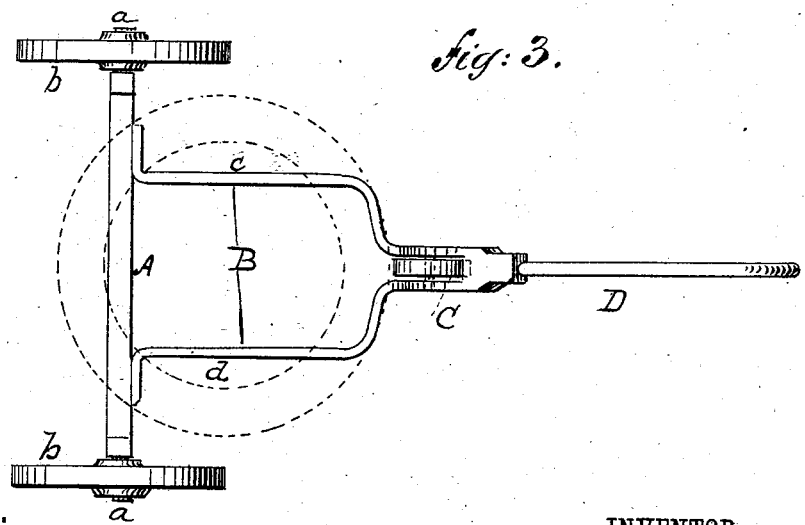

In the accompanying sheet of drawings, Figure 1 is a side view of truck with load; Fig. 2, end view of truck unloaded; Fig. 3, plan or top view of truck.

Similar letters of reference indicate like parts in the several figures.

The truck to which this invention particularly relates is intended for use in stores and warehouses and boats and piers, and it is designed to facilitate the removal of heavy packages—such as barrels and cases—at the expense of but little effort on the part of the person using the truck. To that end I construct my truck with its axle-arm A bent downward from the axle $a$ until this arm is raised by the wheels $b$ sufficiently far from the surface on which it stands to just clear that surface, and no more. To this axle-arm, on its front side, is secured a supporting-frame, B, consisting of two sides, $c$ and $d$. To this frame, at its front, is attached a roller, C, which elevates the front of this supporting-frame from the floor, and from this roller the frame extends and terminates in a fixed and elevated handle, D.

Now, my truck, when it is constructed substantially as described, is employed by simply tilting the barrel or other package to an extent that will permit the axle-arm A to enter sufficiently far beneath the barrel or package to bring the preponderance of the weight of the barrel or package over the arm and the sides $c$ and $d$ of the supporting-frame B, when, by righting itself, the barrel or package will firmly rest on the axle-arm A and supporting-frame B, and may be then wheeled away.

To unload the truck, the barrel or package is tilted slightly backward and the truck instantly withdrawn from beneath it, leaving the barrel or package on the floor.

The wheeling of the truck is facilitated by the roller C and the handle D, which is fixed and elevated to a convenient height for the user to grasp. If desired, the supporting-frame B may be covered, forming a platform on which numbers of smaller packages can be placed. The operation of loading and unloading my truck is so quickly accomplished and with such a small amount of labor to the user of it that large numbers of packages of great weight and size may be moved from one place to another by one man in a short space of time and with but little fatigue.

It is old to make a three-wheel truck the rear axle of which is bent, and it is also old to provide a truck with a frame extended into a handle. I do not broadly claim either.

Having now described my invention, what I claim as new, and desire to secure by Letters Patent, is—

A hand-truck constructed with a bent and lowered axle-arm, A, in combination with wheels $b$ on the axle, a supporting-frame, B, roller-wheel C, and the fixed and elevated handle D, substantially as is shown and described.

BENJAMIN H. BRISTOL.

Witnesses:
L. S. BEARDSLEY,
E. A. BEARDSLEY.